United States Patent
Yang et al.

(10) Patent No.: US 10,003,081 B2
(45) Date of Patent: *Jun. 19, 2018

(54) CATALYST ASSEMBLY AND METHOD OF MAKING THE SAME

(75) Inventors: Jun Yang, Ann Arbor, MI (US); Shinichi Hirano, Wast Bloomfield, MI (US); Richard E. Soltis, Saline, MI (US); Andrew Robert Drews, Ann Arbor, MI (US); Andrea Pulskamp, Plymouth, MI (US); James Waldecker, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 12/911,862

(22) Filed: Oct. 26, 2010

(65) Prior Publication Data

US 2011/0143913 A1    Jun. 16, 2011

(51) Int. Cl.
| | |
|---|---|
| *B01J 23/89* | (2006.01) |
| *B01J 21/06* | (2006.01) |
| *B01J 21/18* | (2006.01) |
| *H01M 4/90* | (2006.01) |
| *H01M 4/92* | (2006.01) |
| *B01J 31/18* | (2006.01) |

(52) U.S. Cl.
CPC ............ *H01M 4/90* (2013.01); *H01M 4/9075* (2013.01); *H01M 4/9083* (2013.01); *H01M 4/92* (2013.01); *H01M 4/925* (2013.01); *H01M 4/926* (2013.01); *B01J 31/1815* (2013.01); *B01J 2531/025* (2013.01); *B01J 2531/845* (2013.01)

(58) Field of Classification Search
CPC .................................. B01J 23/00; B01J 21/06
USPC ... 502/1, 300, 174, 167, 165, 325, 337, 338, 502/350, 353, 182, 216, 215, 240, 171
See application file for complete search history.

(56) References Cited

U.S. PATENT DOCUMENTS

| | | | |
|---|---|---|---|
| 6,040,077 A  * | 3/2000 | Debe et al. ................... | 429/524 |
| 7,608,560 B2 | 10/2009 | Fan et al. | |
| 7,662,740 B2 | 2/2010 | Chondroudis et al. | |
| 7,691,780 B2 | 4/2010 | Adzic et al. | |

(Continued)

FOREIGN PATENT DOCUMENTS

| | | |
|---|---|---|
| EP | 1 748 509 A1 | 1/2007 |
| WO | 2007098432 A2 | 8/2007 |

(Continued)

OTHER PUBLICATIONS

Pauling (Atomic Radii and interatomic distance in metals, Journal of the Americal chemical Society, 1947, 69:542-553).*

(Continued)

*Primary Examiner* — Jun Li
(74) *Attorney, Agent, or Firm* — James Dottavio; Brooks Kushman P.C.

(57) ABSTRACT

According to one aspect of the present invention, there is provided a catalyst assembly. In one embodiment, the catalyst assembly includes a two-dimension (2-D) extensive catalyst including one or more precious catalytic metals and having a catalyst crystal plane; and a substrate supporting the 2-D extensive catalyst, the substrate including one or more non-precious catalytic metals and having a substrate crystal plane in substantial alignment with the catalyst crystal plane.

20 Claims, 10 Drawing Sheets

(56) References Cited

U.S. PATENT DOCUMENTS

| | | | |
|---|---|---|---|
| 2008/0161183 A1* | 7/2008 | Popov et al. | 502/101 |
| 2008/0217738 A1 | 9/2008 | Wang | |
| 2009/0017363 A1* | 1/2009 | Niu et al. | 429/44 |
| 2009/0130502 A1 | 5/2009 | Liu et al. | |
| 2009/0220835 A1* | 9/2009 | Yushan et al. | 429/30 |
| 2009/0247400 A1* | 10/2009 | Stamenkovic et al. | 502/185 |
| 2010/0069228 A1 | 3/2010 | Dopp et al. | |
| 2010/0086675 A1 | 4/2010 | Berta et al. | |
| 2010/0092841 A1* | 4/2010 | Lopez et al. | 429/44 |

FOREIGN PATENT DOCUMENTS

| | | |
|---|---|---|
| WO | 2008/049077 A1 | 4/2008 |
| WO | 2009/029539 A1 | 3/2009 |

OTHER PUBLICATIONS

Electrocatalysis on Bimetallic Surfaces: Modifying Catalytic Reactivity for Oxygen Reduction by Voltammetric Surface Dealloying http://pubs.acs.org/doi/abs/10.1021/ja0742784[Apr. 15, 2010 2:47:06 PM] 2 Pages.

Improved Oxygen Reduction Activity on Pt3Ni(111) via Increased Surface Site Availability http://www.sciencemag.org/cgi/content/abstract/sci;315/5811/493[Apr. 15, 2010 2:46:14 PM] 2 pages.

Oxygen Reduction on Well-Defined Core-Shell Nanocatalysts: Particle Size, Facet, and Pt Shell Thickness Effects http://pubs.acs.org/doi/abs/10.1021/ja9067645[Apr. 15, 2010 2:48:44 PM] 2 pages.

Platinum Monolayer Fuel Cell Electrocatalysts http://www.springerlink.com/content/uw35t160402w7113/[Apr. 15, 2010 2:48:09 PM] 3 Pages.

Structure-Activity-Stability Relationships of Pt—Co Alloy Electrocatalysts in Gas-Diffusion Electrode Layers http://pubs.acs.org/doi/abs/10.1021/jp067269a[Apr. 15, 2010 2:16:06 PM] 2 Pages.

ScienceDirect—International Journal of Hydrogen Energy : Effects of geometric and electronic fa . . . http://www.sciencedirect.com/science?_ob=ArticleURL&_udi=B6V3F-4GFV5G4-2&_user=1 . . . 2 of 3 Apr. 15, 2010 11:04 AM 3 Pages.

Transition Metal Carbides and Nitrides as Electrode Materials for Low Temperature Fuel Cells ISSN 1996-1073 www.mdpi.com/journal/energies 27 Pages.

ScienceDirect—Electrochimica Acta : Synthesis and characterization of MoOx-Pt/C and TiOx-Pt . . . http://www.sciencedirect.com/science?_ob=ArticleURL&_udi=B6TG0-4S2F5RH-6&_user=1 . . . 1 of 3 Apr. 15, 2010 10:55 AM 3 Pages.

ScienceDirect—Applied Catalysis B: Environmental : Electrocatalytic activity and stability of ni . . . http://www.sciencedirect.com/science?_ob=ArticleURL&_udi=B6TF6-4YG1KWH-1&_user= . . . 3 Pages.

ScienceDirect—Journal of Power Sources : High temperature polymer electrolyte membrane fuel . . . http://www.sciencedirect.com/science?_ob=ArticleURL&_udi=B6TH1-4XY4GK2-1&_user=1 . . . 3 Pages.

ScienceDirect—Electrochimica Acta : Pt decorating of PdNi/C as electrocatalysts for oxygen red . . . http://www.sciencedirect.com/science?_ob=ArticleURL&_udi=B6TG0-4X9TTXY-3&_user=9 . . . 3 Pages.

\* cited by examiner

CATALYST ASSEMBLY AND METHOD OF MAKING THE SAME

BACKGROUND

1. Technical Field

The present invention relates to a catalyst assembly and method of making the same.

2. Background Art

Fuel cells are potential low emission energy sources to power vehicles. Existing fuel cell catalysts include platinum (Pt) nano-particles on carbon support. These catalysts are susceptible to catalyst dissolution and/or agglomeration, often require excessive precious catalyst loading, and therefore are cost-inefficient in general.

SUMMARY

According to one aspect of the present invention, there is provided a catalyst assembly. In one embodiment, the catalyst assembly includes a two-dimension (2-D) extensive catalyst including one or more precious catalytic metals and having a catalyst crystal plane; and a substrate supporting the 2-D extensive catalyst, the substrate including one or more non-precious catalytic metals and having a substrate crystal plane in substantial alignment with the catalyst crystal plane. In certain instances, the substrate includes a graphitic compound of M-N—C, wherein M represents a metallic element selected from the groups consisting of Fe, Co, Ni, Cu, and combinations thereof, N represents nitrogen, and C represents carbon. In certain other instances, the substrate includes an aromatic ring structure in the form of $M-N_4$, wherein M represents a metallic element selected from the groups consisting of Fe, Co, Ni, Cu, and combinations thereof, and N represents nitrogen.

In another embodiment, the catalyst crystal plane includes first and second adjacent catalyst atoms defining a catalyst atomic distance, the substrate crystal plane includes first and second adjacent substrate atoms defining a substrate atomic distance, a percent difference between the catalyst and substrate atomic distances is less than 10 percent. In certain instances, the catalyst and substrate crystal planes are positioned next to each other. In certain other instances, the substrate is two-dimension (2-D) extensive such that the 2-D extensive catalyst and the substrate are positioned next to each other in a layer-layer configuration. In certain particular instances, the catalyst assembly is configured as a plurality of core-shell particles, wherein the 2-D catalyst is the shell and the substrate is the core.

In yet another embodiment, the substrate and the 2-D extensive catalyst have at least one crystal plane in common, the common crystal plane being a (111) crystal plane, a (110) crystal plane, a (001) crystal plane, and/or a (0001) crystal plane. In certain instances, the substrate includes a mesh support, the mesh support including one or more pores for transporting water molecules. In certain other instances, the substrate is electronically conductive.

BRIEF DESCRIPTION OF THE DRAWINGS

FIGS. 1B1 and 1B2 collectively depict a schematic view showing atomic distance and atomic distance variation directed to the catalyst assembly of FIG. 1B;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The present invention, in one or more embodiments, provides a substrate and a method of forming the substrate to support the formation of pseudo-bulk catalysts that are 2-D extensive. The 2-D extensive catalyst being supported on the substrate is synergistically provided such that the substrate helps template the growth of the 2-D extensive catalyst and at the same time, provides synergistically enhanced catalytic activities.

In one or more embodiments, and as will be detailed herein elsewhere, the substrate may be formed from preselected materials with certain criteria met. Non-limiting examples of the selection criteria include substrate crystal symmetry, both translational and rotational, relative to a desirable crystal plane of the pseudo-bulk catalyst; and/or atomic distance variation between the pseudo-bulk catalyst and the substrate. In one variation, the pseudo-bulk catalyst may be presented as a 2-D extensive thin film supported on the substrate to form a layer-to-layer catalyst assembly. In another variation, the substrate can be configured as a plurality of nano-particles for seeding the growth of the pseudo-bulk catalyst to form particularized catalyst assembly. The particularized catalyst assembly may then be spray coated onto a preformed mesh support. Thus formed catalyst assemblies are believed to have enhanced catalytic stability while maintaining desirable cost benefits.

Figure 1A:
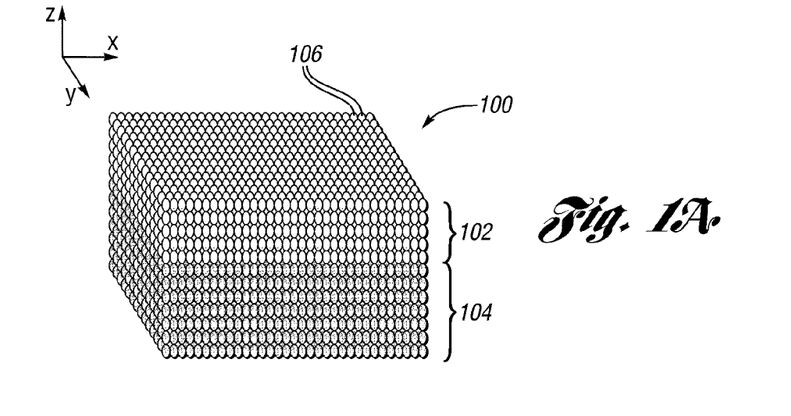
FIG. 1A depicts a catalyst assembly according to one embodiment.

According to one aspect, and as illustratively depicted in FIG. 1A, there is provided a catalyst assembly 100 with relatively increased catalyst reliability and cost-efficiency. The catalyst assembly 100 includes a 2-D extensive catalyst 102 supported on a substrate 104. The 2-D extensive catalyst 102 includes one or more catalyst crystal planes illustratively shown as layers of catalyst atoms 106 arranged in the x-y dimensions. The substrate 104 includes one or more substrate crystal planes illustratively shown as layers of substrate atoms 108 arranged in the x-y dimensions. The substrate 104 includes one or more non-precious catalytic metals for providing certain catalytic activities in addition to its role as a substrate for supporting the 2-D extensive catalyst 102.

In one or more embodiments, the precious catalytic metals that may be included in the 2-D extensive catalyst 102 include ruthenium (Ru), rhodium (Rh), palladium (Pd), silver (Ag), osmium (Os), iridium (Ir), platinum (Pt), gold (Au), and alloys and combinations thereof.

In one or more embodiments, the non-precious catalytic metals that may be included in the substrate 104 include cobalt (Co), nickel (Ni), iron (Fe), titanium (Ti), vanadium (V), chromium (Cr), and alloys and combinations thereof.

As depicted in FIG. 1A, the 2-D extensive catalyst 102 is presented in a pseudo-bulk configuration such that the catalytic metals behave, relative to conventional nano-particles, more like bulk metals. In this pseudo-bulk configuration, the 2-D extensive catalyst 102 is presented as being x-axis and y-axis extensive relative to the z-axis. In certain instances, the thickness dimension along the z-axis may be in a range of 2 to 20 atomic layers. Without wanting to be limited to any particular theory, it is believed that the 2-D extensive catalyst 102 of the catalyst assembly 100 is crystallographically oriented such that the catalytic activities of the 2-D extensive catalyst 102 may be effectively utilized.

In one or more embodiments, the term "crystallographically oriented" refers to that the surface of the 2-D extensive catalyst such as the 2-D extensive catalyst 102 of FIG. 1A is aligned or arranged according to a particular crystal plane, such as a (111) plane, a (110) plane, or a (001) plane.

In one or more embodiments, the catalyst crystal plane of the 2-D extensive catalyst 102 and the substrate crystal plane of the substrate 104 are substantially aligned to facilitate the crystallographical orientation of the catalyst atoms 106. In certain instances, the term "substantially aligned" refers to an atomic distance difference between the 2-D extensive catalyst 102 and the substrate 104 is less than 10 percent, 8 percent, 6 percent, 4 percent, or 1 percent.

Figure 1B:
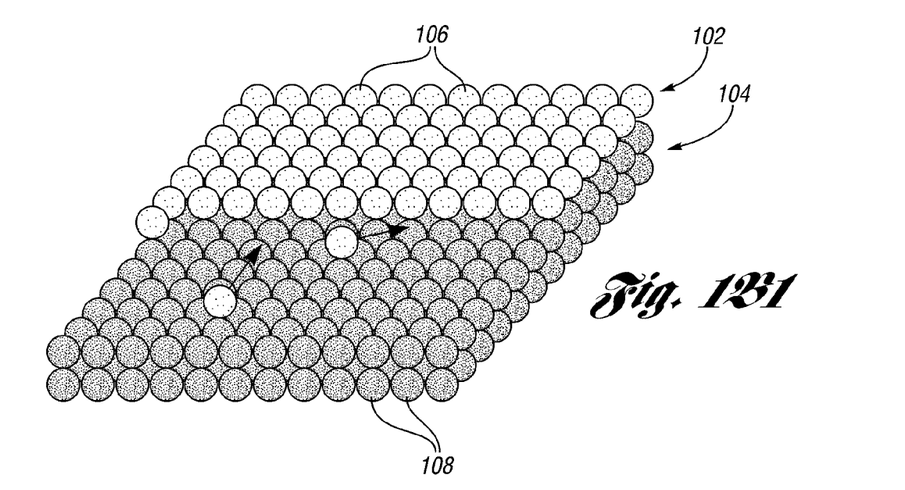
Figure 1B:
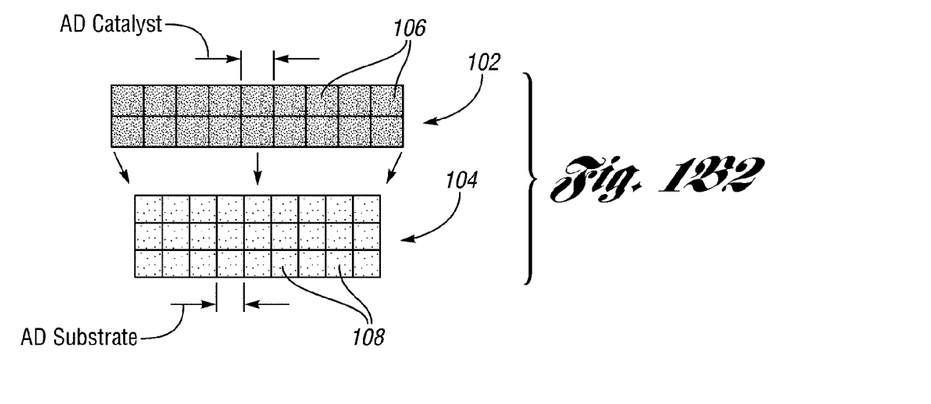

In one or more embodiments, and as depicted in FIGS. 1B1 and 1B2, term "atomic distance" for the 2-D catalyst 102 and the substrate 104 may be represented, respectively, as the distance $AD_{catalyst}$ between any two adjacent catalyst atoms 106 and the distance $AD_{substrate}$ between any two adjacent substrate atoms 108. Term "atomic distance percent difference" refers to $(AD_{catalyst} - AD_{substrate})/AD_{substrate} \times 100\%$.

In certain instances, and as depicted in FIG. 1A, the 2-D extensive catalyst 102 is atomically smooth, for instance, is atomically smooth at the atomic level, and has 2 to 20 atomic layers of crystallographically oriented catalyst crystal plane. In certain particular instances wherein the 2-D extensive catalyst 102 includes platinum (Pt), a relatively high electrocatalytic activities crystal plane is (111) and (110) for Pt, and (111) for platinum nickel alloy $Pt_3Ni$.

In yet another embodiment, the substrate 104 and the 2-D extensive catalyst 102 share at least one common crystal plane, wherein the substrate 104 has a (111) crystal plane, a (110) crystal plane, and/or a (0001) crystal plane.

Figures 2A, 2A, 2A, 2A:
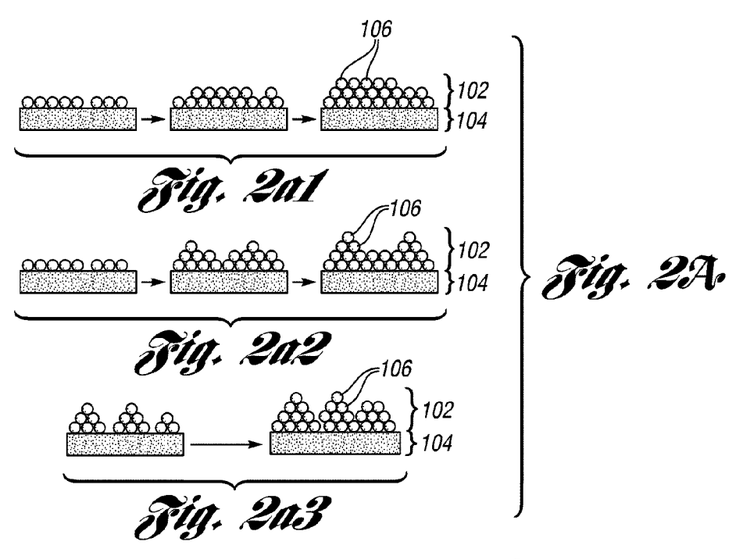
FIGS. 2A and 2B depict various catalyst growth modes for forming a catalyst assembly according to another embodiment.
Figures 2B, 2B, 2B, 2B:
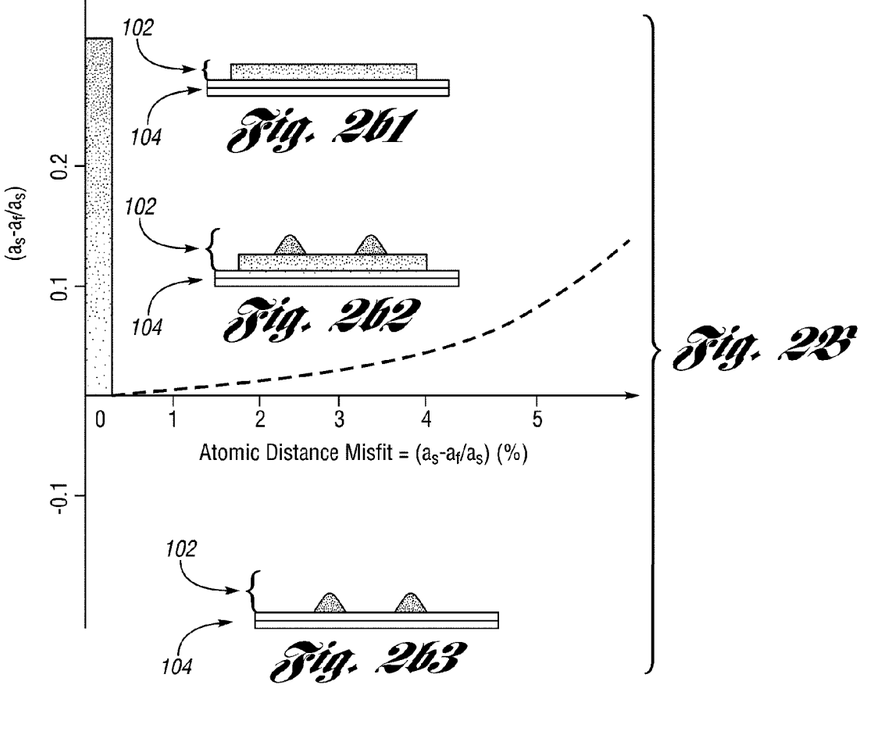

In yet another embodiment, and as depicted in FIGS. 2A and 2B, the catalyst atoms 106 may be deposited onto the substrate 104 via any suitable methods including chemical vapor deposition, physical vapor deposition, chemical and electrochemical deposition, and combinations thereof. Without wanting to be limited to any particular theory, it is believed that the 2-D extensive catalyst 102 nucleates on the substrate 104 via the first few catalyst atoms being deposited as the nuclei, wherein the size and orientation of the nuclei may be determined by the materials characteristics of the substrate and/or the catalyst. These materials characteristics may include differences in crystal symmetry, translational and/or rotational, free surface energy, and interfacial energy.

In one or more embodiments, crystal orientation for both the 2-D extensive catalyst 102 and the substrate 102 may be determined by X-Ray Diffraction; and atomic distance percent difference for both the 2-D extensive catalyst 102 and the substrate 104 may be determined by SEM (Scanning Electron Microscopy) and/or TEM (Transmission Electron Microscopy) imaging analysis.

In one or more embodiments, it has been discovered that the thermodynamic growth mode is a function of the atomic distance variation and the relative differences of free surface energies between the 2-D extensive catalyst 102 and the substrate 104. As depicted in FIGS. 2A and 2B, non-limiting examples of the thermodynamic growth mode include: 1)

layer-by-layer growth generally shown at 2a1 with a resulting catalyst assembly shown at 2b1, when the surface free energy of the substrate 104 is greater than that of the 2-D extensive catalyst 102, and the atomic distance variation is less than 0.4 percent; 2) layer-by-layer initially followed by island growth mode generally shown at 2a2 with a resulting catalyst assembly shown at 2b2, when surface free energy of the substrate 104 is greater than that of the 2-D extensive catalyst 102 and combination of the atomic distance variation and free surface energies ratio between the 2-D extensive catalyst 102 and the substrate 104 fall above the dotted line in the first quadrant; and 3) an island mode generally shown at 2a3 with a resulting catalyst assembly shown at 2b3.

Figure 3A:
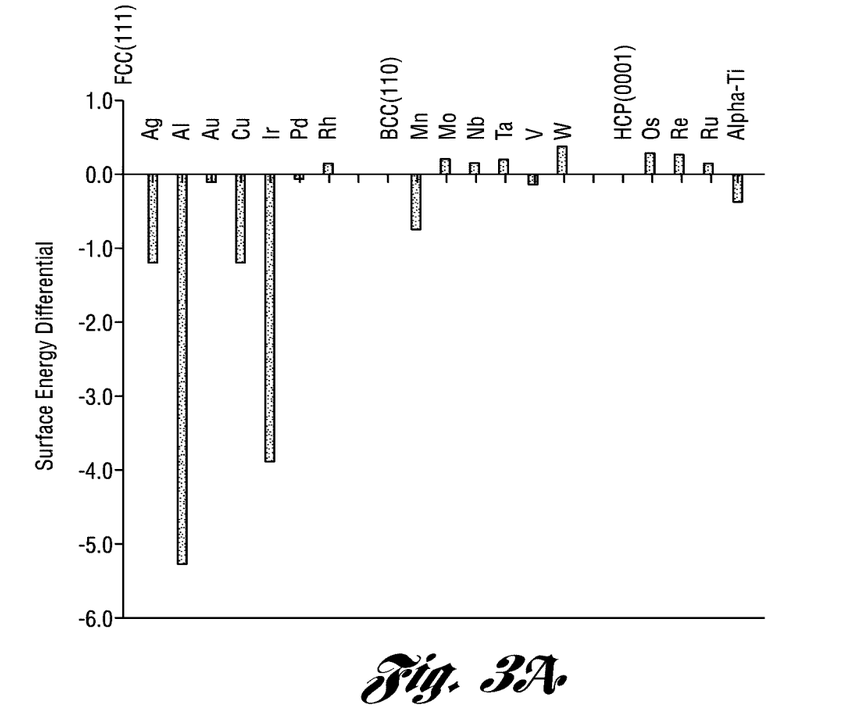
FIGS. 3A to 3C depict free surface energy values of certain materials for forming a catalyst assembly according to yet another embodiment.
Figure 3B:
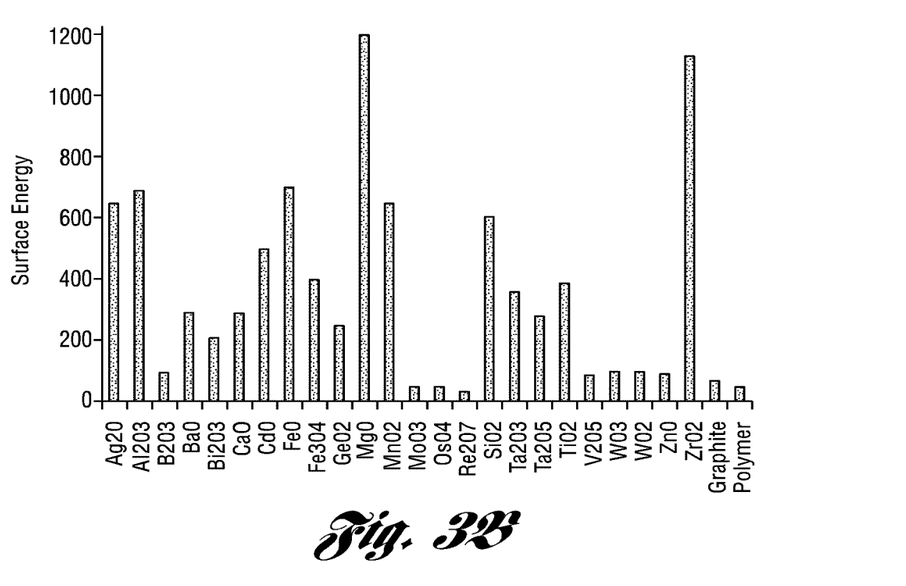
Figure 3C:
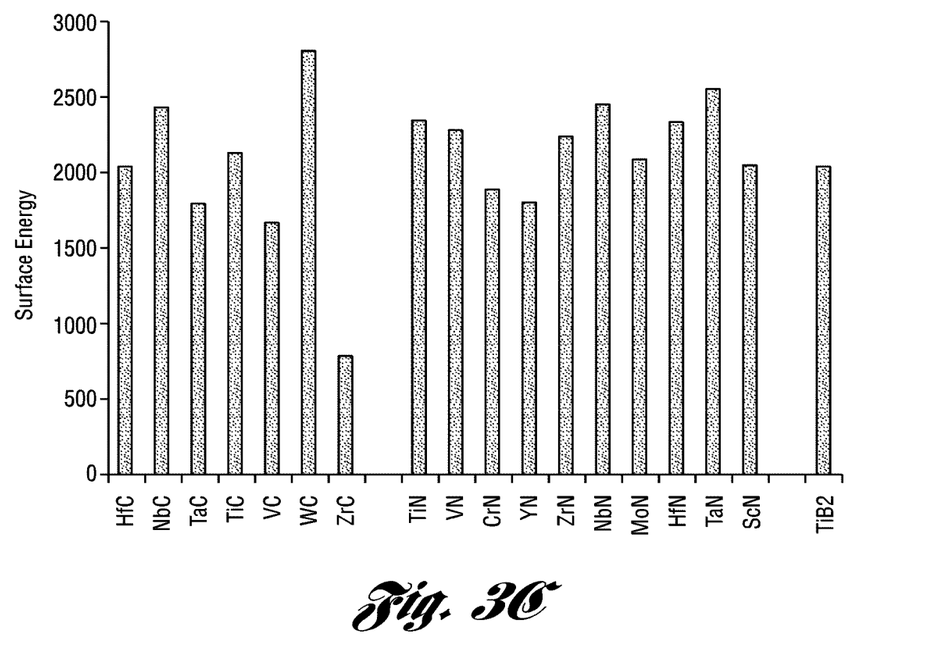

FIGS. 3A to 3C depict relative free surface energy difference or free surface energies of many candidate materials for forming the substrate 104 relative to Pt. Free surface energy of Pt is anisotropic in that Pt in different atomic configurations may have different free surface energy values. Non-limiting examples of free surface energy values for Pt include 2700 mJ/m$^2$ for Pt (111), 3240 mJ/m$^2$ for Pt (110), and 2980 mJ/m$^2$ for Pt (100). FIG. 3A depicts free surface energy differential of several metal elements, in their closest atomic arrangements, relative to free surface energy of (111) Pt. FIG. 3B depicts free surface energies of several selected oxides, graphite, and polymers. FIG. 3C depicts free surface energies of several selected carbides, nitrides and borides. As referenced in FIG. 3A, the y-axis represents the free surface energy difference between the Pt (111) and that of the substrate crystal surface that is commensurate with the Pt (111) in terms of crystal symmetry, and their lattice distance variation is less than 10%; and the x-axis refers to the exemplary elements and their related materials. While in FIGS. 3B and 3C, the y-axis refers to the free surface energies of candidate substrate materials, which are represented by the x-axis.

Without wanting to be limited to any particular theory, based on surface free energy and atomic distance variation, it is believed that certain materials, including certain oxides, graphene-structured materials, polymeric materials, metals, carbides, nitrides, and borides can be used to form the substrate 104 for growing and supporting the 2-D extensive catalyst 102 such as a pseudo-bulk Pt catalyst.

Figure 4:
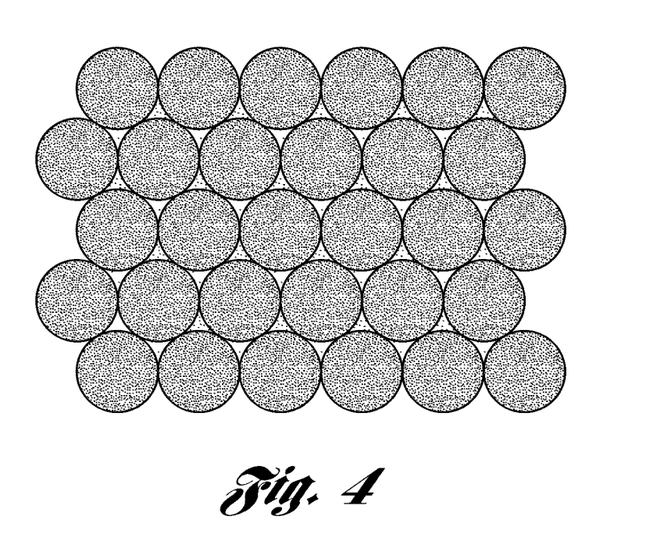
FIG. 4 depicts an exemplary crystal configuration of Pt.

It has been discovered, in one or more embodiments, that pseudo-bulk catalyst nucleation and growth are affected by surface energies, atomic symmetry and/or atomic distance variation; that surface energy differences between substrates and catalysts also affect the catalyst mode of growth. For pseudo-bulk catalyst such as the 2-D extensive catalyst 102 of FIG. 1A wherein the z-axis is of several atomic layer in thickness, crystal orientation of the 2-D extensive catalyst 102 may be dependent upon one or more of the following two criteria. First, crystal symmetry, both translational and rotational, of the substrate 104 is compatible with the crystal symmetry of a crystal plane of the 2-D extensive catalyst 102. Second, atomic distance variation between the substrate 104 and the 2-D extensive catalyst 102 is within certain specified ranges. For Pt and Pt alloys cathode catalyst, the most electro-catalytically active planes for ORR are (110) and (111). Shown in FIG. 4 is one exemplified atomic arrangement of Pt (111) plane with six nearest Pt neighbors at a distance of 2.77 A°.

Figure 5:
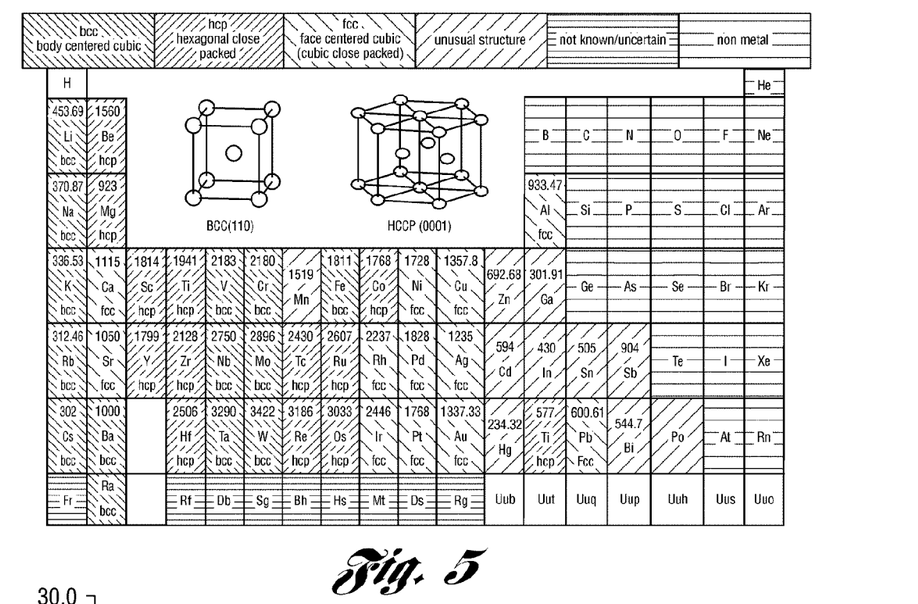
FIG. 5 depicts exemplary materials suitable for forming a catalyst assembly according to yet another embodiment.

In certain instances, suitable materials for forming the substrate may include certain metals. These metals may include, and as depicted in FIG. 5, metal elements and alloys that have simple crystal symmetry compatible with that of Pt (111), especially those with face centered cubic (FCC) structure, the same as Pt, where (111) is the most densely packed crystal plane; metals with body centered cubic (BCC) structure having (110) as the most densely packed crystal plane; and metals with hexagonal close packed (HCP) structure having (0001) as the most densely packed crystal plane.

Figure 6:
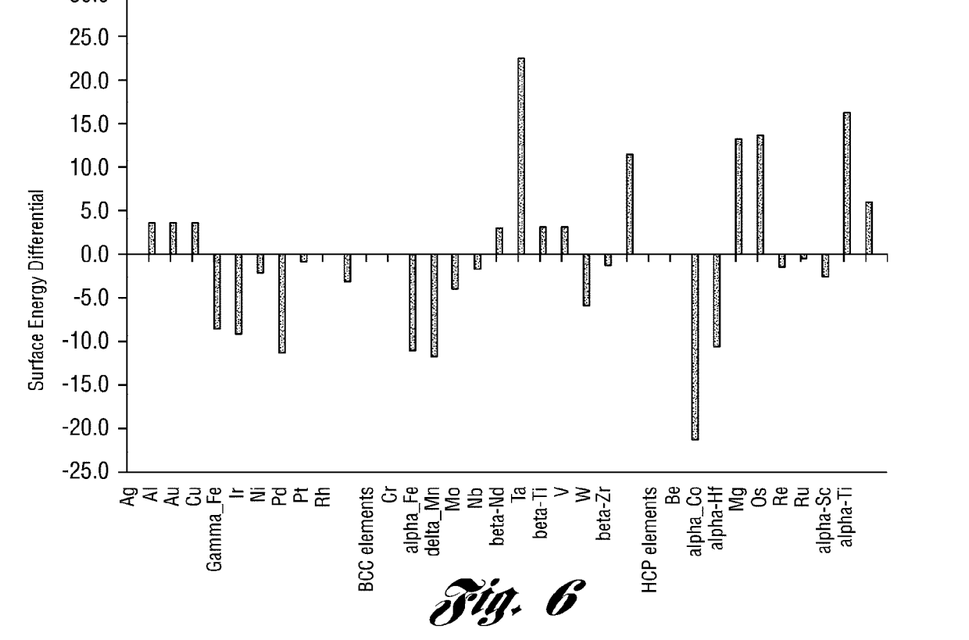
FIG. 6 depicts atomic distance variation percent values of certain materials for forming a catalyst assembly according to yet another embodiment.

In certain other instances, suitable materials for forming the substrate may include elements that have the same atomic symmetry as that of Pt (111), and their atomic distance on the closest packaged plane falls within 10% of that of Pt (111) as shown in FIG. 6 and Table 1. For metallic substrate, its crystal symmetry and atomic distance can be tailored by alloying and processing, leading to many potential metallic alloys that could be used as the substrate materials for pseudo-bulk catalyst development, provided the substrate crystal plane could be grown in the desired crystal orientation.

TABLE 1

| Element | Atomic Distance Variation Percent |
|---|---|
| Ag | 3.61 |
| Al | 3.13 |
| Au | 3.85 |
| Cu | −8.52 |
| Ir | −2.18 |
| Pd | −0.86 |
| Rh | −3.15 |
| delta Mn | −3.97 |
| Mo | −1.76 |
| Nb | 2.96 |
| Ta | 3.12 |
| beta-Ti | 3.14 |
| V | −5.91 |
| W | −1.20 |
| Os | −1.40 |
| Re | −0.46 |
| Ru | −2.58 |
| alpha-Ti | 5.98 |

Figure 7:
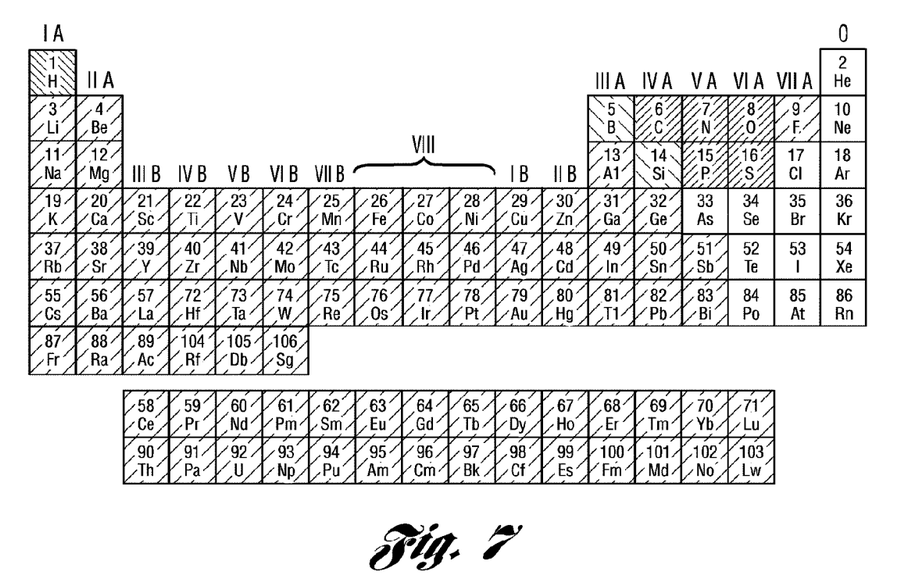
FIG. 7 depicts exemplary elements included in certain ceramic materials for forming a catalyst assembly according to yet another embodiment.

In certain other instances, suitable materials for forming the substrate may include one or more ceramic compounds. Ceramic compounds are a combination of one or more metallic elements such as Fe and Co included under the lighter strip shading with one or more nonmetallic elements such as C and N included under the heavier strip shading as shown in FIG. 7. In certain instances, ceramic compounds may be classified into oxides, carbides, nitrides, borides, and graphene-structured materials and their solid solutions.

Without wanting to be limited by any particular theory, it is believed that certain ceramic compounds have crystal structures and/or atomic arrangements that are compatible to those of precious catalyst metals such as Pt. In oxides, for instance, oxygen (O) atoms occupy the crystal lattice sites, and the crystal-symmetry-compatible O plane may act as the substrate plane to template crystographically oriented (111) Pt atomic layer catalyst films. For instance also, in metal carbides, nitrides, and borides, the lighter constitutive elements C, N, and B occupy the interstitial sites in the crystal lattice, accompanied by lattice expansion and sometimes also transformation in crystal structure. The atomic plane formed by metal atoms with compatible symmetry will be the plane to orient the (111) Pt catalyst. Non-limiting examples of these compounds are listed in Table 2.

TABLE 2

| | | | | |
|---|---|---|---|---|
| TiO$_2$ | Tetragonal | (100) | O—O | 2.78A° |
| NbO | FCC | (111) | O—O | 2.97A° |
| α-Al$_2$O$_3$ | RHO | (0001) | O—O | 2.53A° |
| WC | Hexagonal | (0001) | W—W | 2.90A° |
| TiN | FCC | (111) | Ti—Ti | 3.03A° |
| TiC | FCC | (111) | Ti—Ti | 3.04A° |

Figure 8:
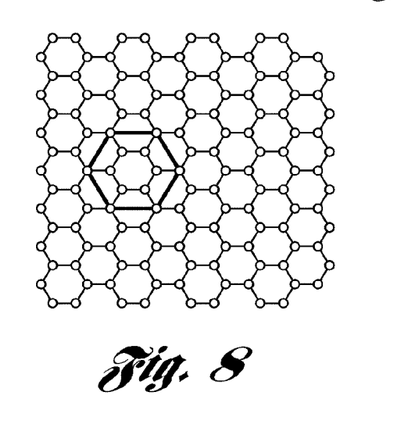
FIG. 8 depicts exemplary structure of graphene as included in materials for forming a catalyst assembly according to yet another embodiment.

In one or more embodiments, suitable materials for forming the substrate 104 include elemental carbon, metal sulfides, selenides, silicides, or combinations thereof. Without wanting to be limited to any particular theory, it is believed that elemental carbon, metal sulfides, selenides, and/or silicides possess the crystal structure of graphene as shown in FIG. 8, where the crystal symmetry on the layered plane is compatible with Pt (111). In certain instances when the atomic distance variation is suitable, such as in the case of graphite, these materials help grow pseudo-bulk Pt (111) catalyst of several atomic layer thick, consistent with the observation of 80% of Pt is (111) plane in 2-3 nm Pt nano-particles on amorphous carbon.

Figure 9:
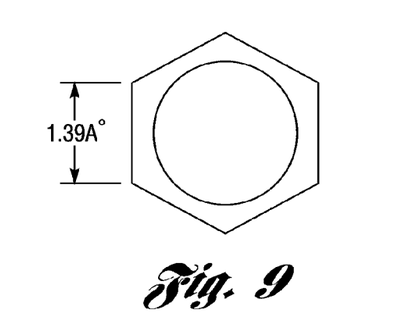
FIG. 9 depicts an exemplary benzene-ring structure included in materials for forming a catalyst assembly according to yet another embodiment.

In one or more embodiments, suitable materials for forming the substrate 104 include polymeric materials including H and one or more of elements B, C, N, O, F, P, and Si, as depicted in FIG. 7. Particularly useful polymeric materials may include one or more aromatic rings, such as benzene-ring structure as depicted in FIG. 9. Without wanting to be limited to any particular theory, it is believed that in this design, the resultant substrate is provided with the atomic symmetry that is compatible with that of Pt (111), and the atomic distance is relatively close to the atomic distance between Pt atoms on the (111) crystal plane.

In certain instances, the polymeric materials include copolymers such as di-block or tri-block copolymers, which can be tailored into thin layered substrates compatible with the 2-D extensive catalyst 102. In certain particular instances, the polymeric materials can be rendered electronically conductive, as in conductive polymers, the resultant conductive substrate has the additional benefit of reducing resistance losses across the thickness dimension of the 2-D extensive catalyst 102. Non-limiting examples for this type of polymeric materials include molecular or molecular-derived catalysts, which include phthalocyanines, porphyrins, Schiff bases and related derivatives, and Metal-N$_4$ macrocycles (M=Fe, Co, Ni, or Cu), dubbed as oxidative multi-electron transfer catalysts. Other materials, such as metal-organic frameworks with repeated aromatic rings as the linkers could also be candidate substrate materials. In certain other instances, suitable polymeric materials may also include polymers that contain translational and rotational repeat units of aromatic rings that are compatible with those of Pt (111) could serve as substrate materials.

In another aspect of the present invention, there is provided a method of selecting substrates for supporting pseudo-bulk catalyst such as 2-D extensive catalyst 102. In certain instances, materials for forming the substrate 104 are selected to have compatible crystal symmetry, both rotational and translational, with that of a desirable crystal plane of the 2-D extensive catalyst 102. In certain other instances, materials for forming the substrate 104 are selected such that atomic distance variation between the catalyst and the substrate is within a certain limit to ensure the growth of atomically smooth 2-D extensive catalyst of several atomic layers.

Figure 10:
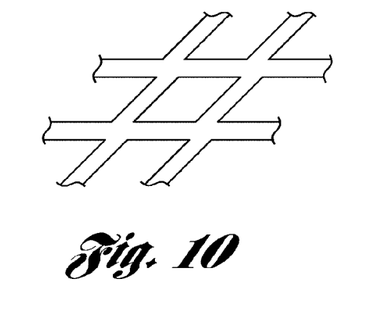
FIG. 10 depicts an exemplary mesh structure included in a catalyst assembly according to yet another embodiment.
Figure 15:
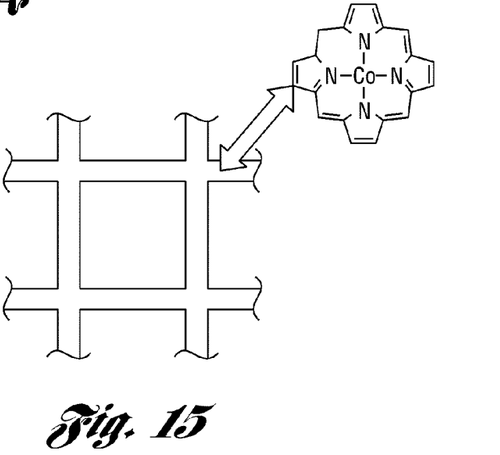
FIG. 15 depicts a non-precious metal catalytic substrate configured as a mesh for supporting thereupon a 2-D extensive precious metal catalyst according to yet another embodiment.

It has also been discovered that water management can be advantageously managed with the catalyst assembly 100 according to one or more embodiments. In certain instances, the substrate is further configured to have a mesh structure such as one generally shown in FIG. 10. Without wanting to be limited to any particular theory, it is believed that the substrate 104 in this mesh design helps facilitate water management by reducing unnecessary water accumulation while supporting the 2-D extensive catalyst 102. A non-limiting example of a mesh substrate according to this design is depicted in FIG. 15. Non-precious metal catalytic substrate can itself form the mesh or can be applied onto a pre-existing mesh structure in a film or coating. The molecular or molecular-derived non-precious metal catalytic substrate may include one or more materials including aromatic ring containing structures and graphene containing structures as discussed herein elsewhere. The 2-D extensive precious metal catalyst 102 such as a crystallo graphically oriented Pt or Pt alloy catalyst can be grown onto the mesh substrate with a thickness of 2 to 20 atomic layers.

Figure 11A:
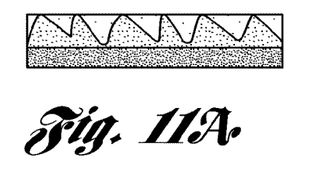
FIGS. 11A to 11F depict non-limiting examples of particularized catalyst assembly according to yet another embodiment.
Figure 11B:
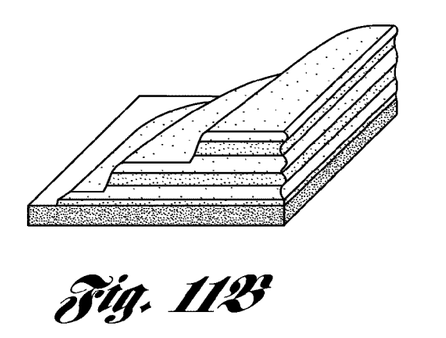
Figure 11C:
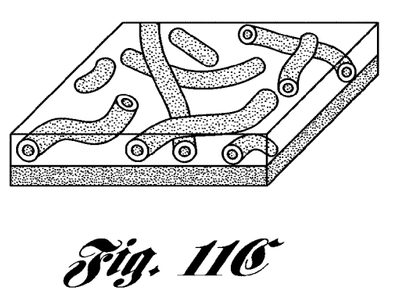
Figure 11D:
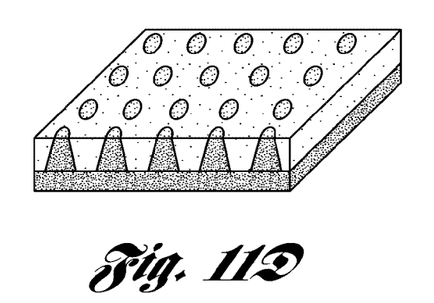
Figure 11E:
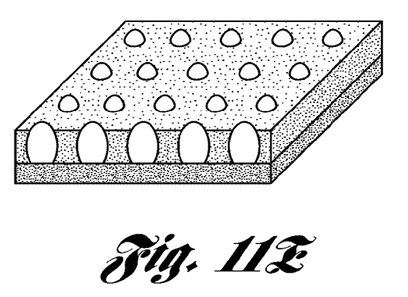
Figure 11F:
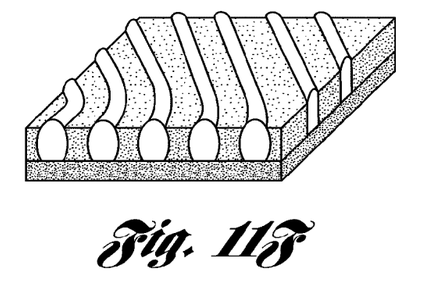

The mesh substrate 1000 structure can be made with any suitable methods. A non-limiting example of the methods for making the mesh substrate 1000 structure is illustrated as follows. In this example, the meshed seeding mesh structure 1000 is generated via processing one or more block-copolymers as shown in FIG. 11. The block-copolymers may include aromatic-ring structured polymers, which lie flat along a mesh plane. The resultant mesh structure is then used to seed and template the growth of pseudo-bulk catalyst. In certain instances, the mesh structure may include one or more polymers that are also electronically conductive, and the resultant mesh structure can reduce the electrical resistance loss in the catalyst layers. In certain other instances, the polymer-based mesh structure can be made flexible, suitable for direct inclusion into an electrochemical environment such as one for the fuel cell applications.

Figure 12A:
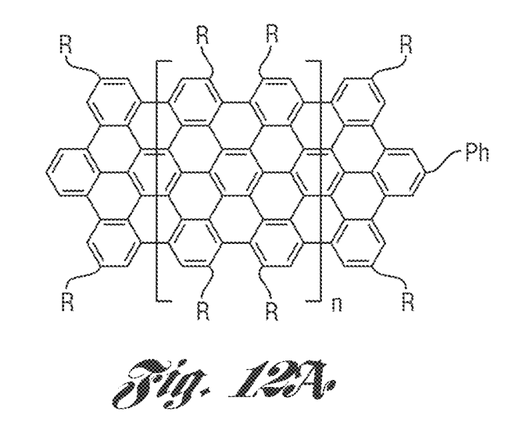
FIGS. 12A to 12C depict several ring structures used in materials forming a catalyst assembly according to yet another embodiment.
Figure 12B:
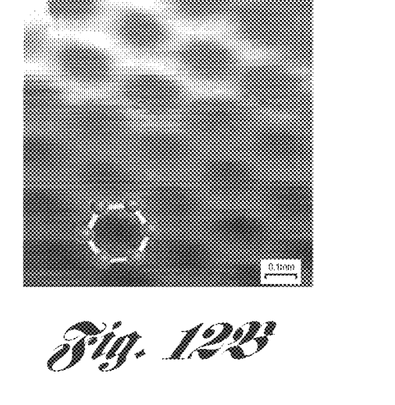
Figure 12C:
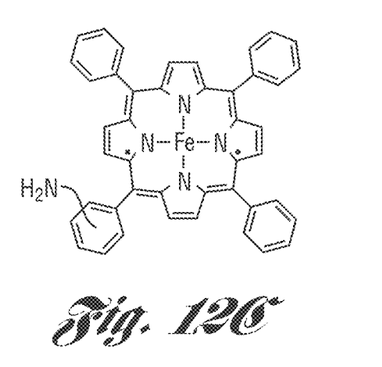

In yet another embodiment, the mesh structure is formed of a mesh support and a substrate coating disposed onto the mesh support. The mesh support can be preformed to have appropriate pore sizes for water transportation, and can optionally be a part of the catalyst layer with suitable material flexibility, corrosion resistance, and electric conductivity as detailed herein. Once formed, the mesh support can then be processed to incorporate a substrate coating. A non-limiting example of the substrate coating can be formed from a layer of aromatic-ring structured polymer, a single-layer graphene, or some non-precious metal catalysts such as metal oxides, carbides, nitrides, or molecular-based non-precious metal catalysts such as metalloporphyrins with the suitable atomic arrangements and atomic distance variation relative to those of Pt-based catalysts. Once the mesh substrate is formed for use as a seeding template, Pt-based catalyst is then generated on top of the seeding template via any suitable processing methods. Non-limiting examples of the processing methods include chemical vapor deposition, physical vapor deposition, wet chemical deposition, electrochemical deposition methods, and a combination thereof. Several examples for forming the seeding template can be found in FIGS. 12A to 12C.

Figure 16A:
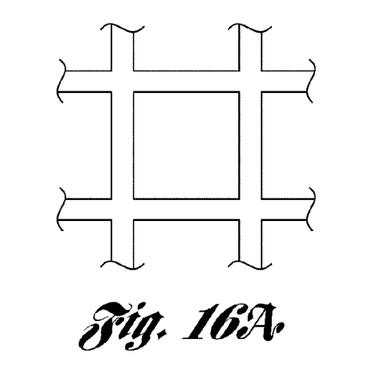
FIGS. 16A to 16C depict a schematic view of non-precious metal inorganic compounds used to template atomic layer crystallographically oriented Pt-based catalysts according to yet another embodiment.
Figure 16B:
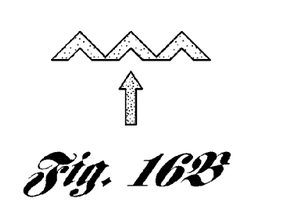
Figure 16C:
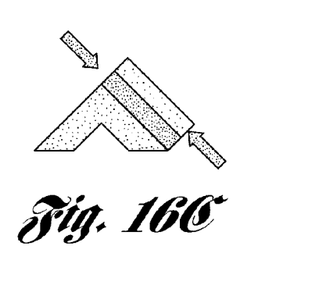

A non-limiting example of forming the mesh structure is depicted in FIGS. 16A to 16C. In this configuration, a mesh support is pre-formed to have a plain view of FIG. 16A and a cross-sectional view of FIG. 16B which shows a corrugated design. As illustrated in FIG. 16C, the mesh support with corrugated surfaces is particularly positioned in supporting a layer of non-precious metal catalytic substrate of inorganic compounds and thereupon a layer of 2-D extensive precious metal catalyst. In this design, it is believed that the precious metal catalyst may be grown onto the substrate layer with desirable atomic arrangements for crystallographically oriented catalyst growth.

Figure 13:
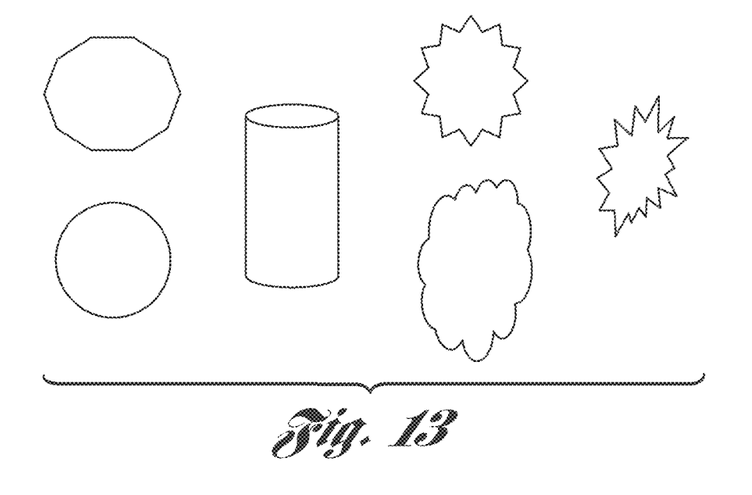
FIG. 13 depicts non-limiting examples of particle morphologies of a substrate according to yet another embodiment.

In yet another embodiment, the seeding template can be formed to have various morphologies. Non-limiting examples of the morphologies are depicted in FIG. 13. Without wanting to be limited to any particular theory, it is believed that these various morphologies help enhance the effective electro-catalytic surface area of the catalysts disposed thereupon.

In certain instances, the substrate 104 can be configured as substrate particles, which can then be disposed on top of a pre-formed mesh support via suitable methods such as nano-molding in conjunction with processing of polymeric mesh structure through any suitable methods such as nano-lithography and/or nano-casting, or through coating onto an existing mesh. Once this mesh substrate is formed, catalysts such as Pt catalysts deposited onto the mesh substrate to have the psedo-bulk characteristics. Without wanting to be limited to any particular theory, it is believed that this design is provided with the additional benefits of providing increased surface area on a fixed geometric surface area. In certain instances, the mesh substrate particles can also be included as part of the catalyst assembly or can be removed after the completion of the seeding process. In certain particular instances, the mesh substrate particles have 2-D elongated with a L/D (length to diameter ratio) of between 2 and 20.

In certain other instances, particles of the substrate can be pre-coated with crystallographically oriented catalysts such as Pt catalysts to provide a catalyst with enhanced electro-catalytic activities. Without wanting to be limited to any particular theory, it is believed that one or more factors are involved in the enhanced electro-catalytic activities; and the factors include increased electro-catalytically active surface plane, increased effective surface area, and improved substrate-catalyst d-band interaction through substrate-catalyst chemical communications. The thus-formed substrate-catalyst mixture can be applied as an ink and disposed onto the mesh support. Contrary to conventional catalyst nano-particles such as Pt nano-particles on carbon support, particles of the substrate-catalyst mixture according to one or more embodiments are 2-D extensive such that a substantial portion or the entirety of the particles, and each has 2 to 20 atomic layers of precious metal catalyst in thickness dimension.

Figure 14A:
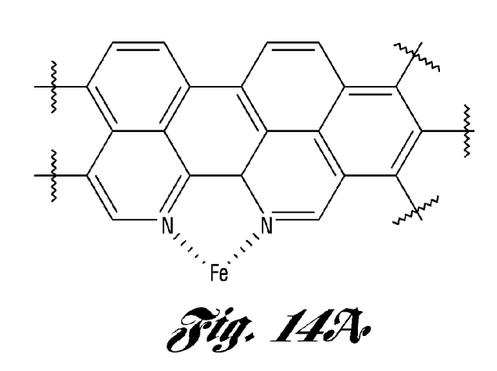
FIGS. 14A to 14B depict in-plane crystal structures of two exemplary non-precious metal catalytic substrates, the M-C—N type substrate and the $M-N_4$ type substrate, respectively, according to yet another embodiment.
Figure 14B:
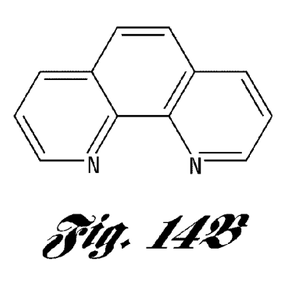

In certain instances, the substrate 104 includes a graphitic crystal structure in the form of M-N—C, and/or an aromatic ring structure in the form of M-$N_4$, wherein M represents one or more metallic elements such as Fe, Co, Ni, and Cu, N represents nitrogen, and C represents carbon. A non-limiting example for the M-N—C non-precious metal catalytic substrate is depicted in FIG. 14A. A non-limiting example of the M-$N_4$ non-precious metal catalytic substrate is depicted in FIG. 14B. It is believed that the 2-D extensive catalyst 102 such as crystallographically oriented Pt or Pt alloy catalyst can be grown onto the M-N—C or the M-$N_4$ substrate through one or more methods including wet chemical deposition, electrochemical deposition, physical vapor deposition, chemical vapor deposition, and combinations thereof.

Figure 17:
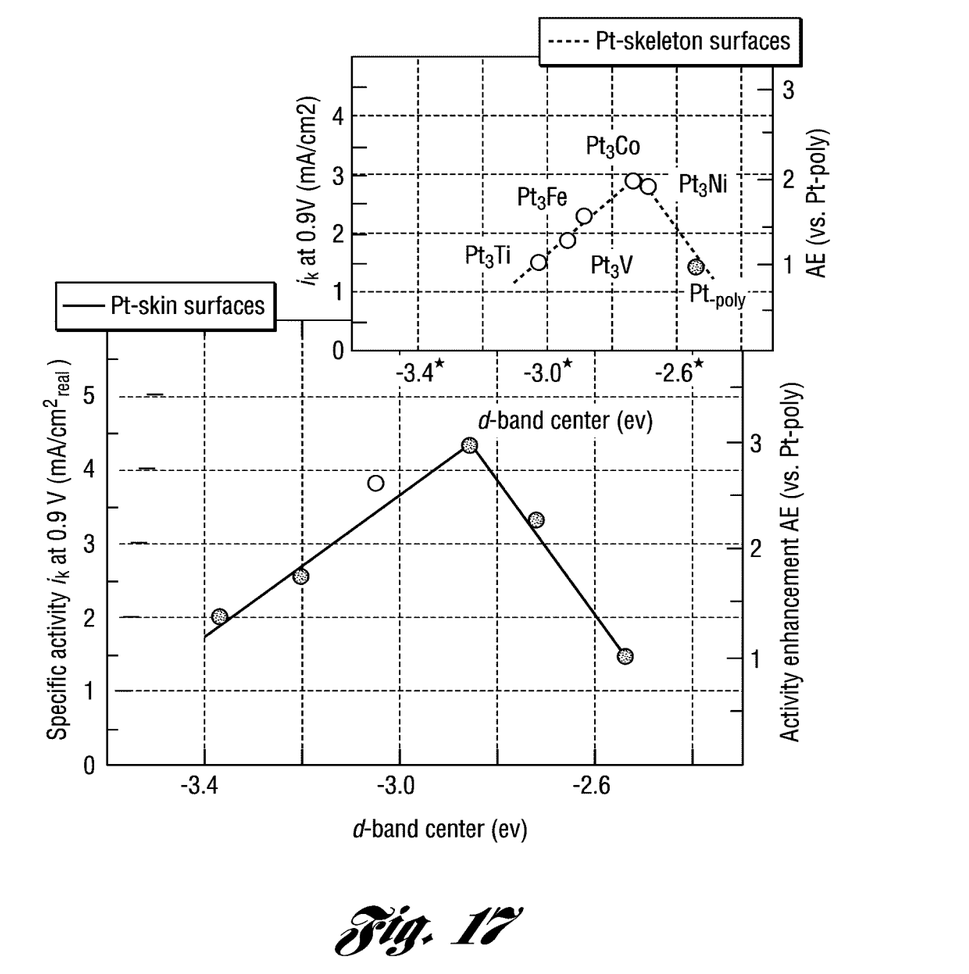
FIG. 17 depicts an illustrative interconnection between the catalytic properties and electronic properties of $Pt_3M$ alloys.

In certain instances, the substrate 104 includes one or more non-precious catalytic metals, and particularly transition metals, selected from the group consisting of Co, Ni, Fe, Ti, V, Cr, and combinations and alloys thereof. Without wanting to be limited to any particular theory, it is believed that inorganic compounds such as transition metal and metal alloys are capable of providing suitable atomic arrangements and atomic distance variation for seeding the growth of crystallographically oriented precious metal catalysts 102. It is further believed that non-precious transition metals such as Co, Fe, Ti, V, and Ni synergistically enhance the electro-catalytic activities of the precious metal catalyst through the d-band effects as illustratively shown in FIG. 17.

The following application discloses and claims catalyst assemblies that may be related to the catalyst assembly disclosed and claimed herein: U.S. patent application Ser. No. 12/911,827, filed on Oct. 26, 2010, now U.S. Pat. No. 9,640,802 issued May 2, 2017 the entire contents of thereof are incorporated herein by reference.

While the best mode for carrying out the invention has been described in detail, those familiar with the art to which this invention relates will recognize various alternative designs and embodiments for practicing the invention as defined by the following claims.

What is claimed:

1. A catalyst assembly comprising:
a planar crystalline catalyst of precious metal atoms and supported on a crystalline substrate, the crystalline substrate including non-precious metal atoms, the planar crystalline catalyst includes one or more inner layers, one or more intermediate layers and one or more outer layers and including an exposed surface layer crystallographically oriented according to a (111) plane, the crystalline substrate and planar crystalline catalyst interact through d-band interaction, and all of the layers of the planar crystalline catalyst have the same precious metal catalyst composition.

2. The catalyst assembly of claim 1, wherein the substrate includes a graphitic compound of M-N—C, wherein M represents a metallic element selected from the groups consisting of Fe, Co, Ni, Cu, and combinations thereof, N represents nitrogen, and C represents carbon.

3. The catalyst assembly of claim 1, wherein the substrate includes an aromatic ring structure in the form of M-$N_4$, wherein M represents a metallic element selected from the groups consisting of Fe, Co, Ni, Cu, and combinations thereof, and N represents nitrogen.

4. The catalyst assembly of claim 1, wherein the non-precious metal atoms of the substrate include Co, Ni, Fe, Ti, V, and combinations and alloys thereof.

5. The catalyst assembly of claim 1, wherein the crystalline catalyst includes a first and second adjacent catalyst atoms defining a catalyst atomic distance, the substrate includes a substrate crystal plane of a first and second adjacent substrate atoms defining a substrate atomic distance, and a percent difference between the catalyst and substrate atomic distances is less than 10 percent.

6. The catalyst assembly of claim 5, wherein the catalyst and substrate crystal planes are positioned next to each other.

7. The catalyst assembly of claim 1, wherein the substrate is adjacent the crystalline catalyst in a layer-layer configuration.

8. The catalyst assembly of claim 5, wherein the substrate and the crystalline catalyst share a (111) crystal plane.

9. The catalyst assembly of claim 1, wherein the substrate includes a mesh support, the mesh support including one or more pores for transporting water molecules.

10. The catalyst assembly of claim 1, wherein the substrate is electronically conductive.

11. The catalyst assembly of claim 1, wherein the atomic distance between two adjacent catalyst atoms and the atomic distance between any two adjacent substrate atoms is less than 0.4 percent.

12. The catalyst assembly of claim 1, wherein the crystalline substrate has a surface free energy that is greater than that of the planar crystalline catalyst.

13. The catalyst assembly of claim 1, wherein all of the layers of the planar crystalline catalyst have the same platinum catalyst metal composition.

14. A catalyst assembly comprising:
a planar crystalline catalyst of precious metal atoms, the crystalline catalyst having a catalyst crystal plane including two adjacent atoms defining a catalyst atomic distance, and an exposed surface layer crystallographically oriented according to a (111) plane, the planar crystalline catalyst includes one or more inner layers, one or more intermediate layers and one or more outer layers, and all of the layers of the planar crystalline catalyst have the same precious metal catalyst composition; and
a substrate supporting the planar crystalline catalyst and including non-precious metal atoms, the substrate having a substrate crystal plane positioned next to the catalyst crystal plane, the substrate crystal plane including two adjacent atoms defining a substrate atomic distance, the percent difference between the catalyst and substrate atomic distances is less than 10 percent, and the catalyst crystal plane including a (111) crystal plane, the crystalline substrate and planar crystalline catalyst interact through d-band interaction.

15. The catalyst assembly of claim 14, wherein the substrate includes a graphitic compound of M-N—C, wherein M represents a metallic element selected from the groups consisting of Fe, Co, Ni, Cu, and combinations thereof, N represents nitrogen, and C represents carbon.

16. The catalyst assembly of claim 14, wherein the substrate includes an aromatic ring structure in the form of $M-N_4$, wherein M represents a metallic element selected from the groups consisting of Fe, Co, Ni, Cu, and combinations thereof, and N represents nitrogen.

17. The catalyst assembly of claim 14, wherein the substrate is adjacent the planar crystalline catalyst in a layer-layer configuration.

18. The catalyst assembly of claim 14, wherein the planar crystalline catalyst includes a number of precious metal atomic layers, the planar crystalline catalyst includes one or more inner layers, one or more intermediate layers and one or more outer layers.

19. The catalyst assembly of claim 14, wherein the substrate is a mesh including one or more pores for transporting water molecules.

20. A catalyst assembly comprising:
a planar crystalline catalyst having a catalyst crystal plane including two adjacent atoms defining a catalyst atomic distance; and
a crystalline substrate supporting the planar crystalline catalyst and including non-precious metal atoms, the substrate having a substrate crystal plane positioned next to the catalyst crystal plane, the substrate crystal plane including two adjacent atoms defining a substrate atomic distance, the percent difference between the catalyst and substrate atomic distances being less than 10 percent, the planar crystalline catalyst including one or more inner layers, one or more intermediate layers and one or more outer layers having the same composition and including an exposed surface layer crystallographically oriented according to a (111) plane, the crystalline substrate and planar crystalline catalyst interact through d-band interaction, and all of the layers of the planar crystalline catalyst have the same precious metal catalyst composition.

* * * * *